US006977802B2

(12) United States Patent
Chatenet

(10) Patent No.: US 6,977,802 B2
(45) Date of Patent: Dec. 20, 2005

(54) ETCHED CIRCUIT FOR LIGHTING PROTECTION

(75) Inventor: Jean-Paul Chatenet, Franconville (FR)

(73) Assignee: Thales, Paris (FR)

( * ) Notice: Subject to any disclaimer, the term of this patent is extended or adjusted under 35 U.S.C. 154(b) by 453 days.

(21) Appl. No.: 10/092,631

(22) Filed: Mar. 8, 2002

(65) Prior Publication Data

US 2002/0180382 A1 Dec. 5, 2002

(30) Foreign Application Priority Data

Mar. 9, 2001 (FR) .......................................... 01 03254

(51) Int. Cl.[7] .............................................. H02H 9/00

(52) U.S. Cl. ........................... 361/56; 361/58; 361/111; 361/113; 361/118

(58) Field of Search ............................ 361/56, 18, 111, 361/113, 58, 118, 92, 94, 93.1, 115

(56) References Cited

U.S. PATENT DOCUMENTS 4,985,800 A 1/1991 Feldman et al. ............ 361/113
5,101,180 A * 3/1992 Frey ............................ 333/12
5,844,766 A 12/1998 Miglioli ...................... 361/119

FOREIGN PATENT DOCUMENTS

EP 0 689 261 A1 12/1995
EP 0 803 927 A2 10/1997
EP 1 037 308 A1 9/2000

* cited by examiner

*Primary Examiner*—Stephen W. Jackson
(74) *Attorney, Agent, or Firm*—Oblon, Spivak, McClelland, Maier & Neustadt, P.C.

(57) ABSTRACT

The disclosure relates to the lightning protection of the transmitters in a transmission system. An etched circuit with lightning protection comprises at least one main line connected to a connector adapted to the output of a transmission antenna of the transmission system working at a fixed frequency or in a narrow frequency band around the fixed frequency. The circuit comprises a main line and at least one first line connected to the main line and substantially equivalent to an open circuit with respect to the main line for the stated frequency. The circuit can also perform a harmonic filtering function, thus increasing compactness by using a single circuit for both functions.

14 Claims, 2 Drawing Sheets

ETCHED CIRCUIT FOR LIGHTING PROTECTION

BACKGROUND OF THE INVENTION

The invention relates to the lightning protection of transmitters in a transmission system.

The function of lightning protection calls for a high-pass filter because the lightning signal is a low-frequency signal. FIG. 1 shows a lumped-element lightning protection system. It has two induction coils 11 and 12, each grounded. The first induction coil 11 is connected directly to the transmission antenna. It attenuates low frequencies. A capacitor 13 is placed between these two induction coils 11 and 12. The capacitor 13 filters the high frequencies. The second induction coil 12 is optional. It improves the attenuation.

Lightning protection circuits of this kind are made of linear, discrete components. However, they are very bulky and are complicated to manufacture

SUMMARY OF THE INVENTION

The present invention can be used to obtain an etched circuit comprising a lightning protection function of this kind, thus reducing space requirement and providing for easier and lower-cost manufacture (because, inter alia, there are fewer components).

An object of the invention is an etched circuit with lightning protection comprising at least one main line connected to a connector adapted to the output of the transmission antenna of the transmission system working at a fixed frequency $f_0$ or in a narrow frequency band $\Delta f_0$, the circuit comprising a capacitor, wherein said circuit comprises at least one first line with a length $l_1$ and a width that may or may not be constant, connected to said connector and terminated by a short-circuit that is open-circuited with respect to the main line.

The circuit proposed by the invention is furthermore used to filter the second harmonic.

Another object of the invention is a method for the manufacture of an etched circuit with lightning protection comprising the etching of the lines and of the capacitor of said etched circuit on the base of said circuit, the depositing of a film of conductive material and, if necessary, the scraping away of the excess conductive material in order to retain only the conductive material that has been deposited in the etching.

The invention furthermore proposes the application of the above-defined etched circuit with lightning protection to the filtering of the second harmonic $2f_0$ and the third harmonic $3f_0$.

BRIEF DESCRIPTION OF THE DRAWINGS

The characteristics and advantages of the invention shall appear more clearly from the following description, given by way of an example, and from the appended figures of which.

DETAILED DESCRIPTION OF THE DRAWINGS

Figure 2:
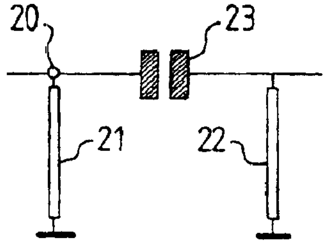
FIG. 2 shows the lightning protection function on an etched circuit according to the invention.

If the lumped-element lightning protection circuit is expressed in distributed constants, as illustrated in FIG. 2, the inductors 11 and 12 are replaced by conductive lines 21 and 22 etched on a quarter wavelength at the frequency $f_0$ used. The lines 21 and 22 are each terminated by a short-circuit. The main line and the capacitor 23 are placed between these two lines 21 and 22.

Let us take the example of a circuit of this kind with 22-nH inductors and a 47-pF capacitor. For 1000 V injected into this circuit, only 50 V remains at output.

Given that, at the at the frequency $f_0$ used, a quarter-wave line that is shorted at one end is the equivalent of an open circuit at its other end for this same frequency, the two lines 21 and 22 are open-circuited with respect to the main line at the frequency $f_0$.

At the second harmonic $2f_0$, this same line is therefore the equivalent of a short-circuit. The lightning protection on the etched circuit in the diagram proposed in FIG. 2 therefore represents an excellent $2f_0$ rejector (namely a filter stopping said frequency $2f_0$).

The first line 21 is therefore used to filter the low frequencies of the lightning signal and reject the second harmonic.

The second line 22 is optional. It improves the attenuation presented.

Figure 1:
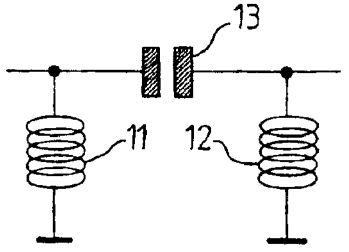
FIG. 1 shows a lumped-element lightning protection circuit according to the prior art

Hitherto, the lighting protection and harmonic filtering functions were carried out separately by two circuits. The lumped-elements circuit shown in FIG. 1 provided lightning protection. The harmonic filtering function used to be carried out either by a lumped-element circuit such as the one shown in FIG. 3 or an etched circuit such as that of FIG. 4.

Harmonic filtering is a low-pass type of filtering. The circuits of FIGS. 3 and 4 are used to reject the second harmonic $2f_0$ and the third harmonic $3f_0$.

Figure 3:
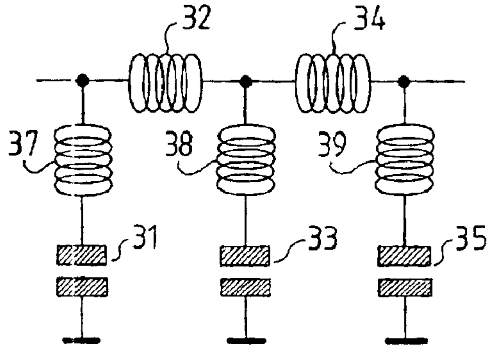
FIG. 3 shows a lumped-element harmonic filtering circuit according to the prior art.

The lumped-element drawing of FIG. 3 comprises three parallel-connected capacitors 31, 33 and 35, grounded at one of their ends, and two inductors 32 and 34, one inductor between each of the two capacitors. If necessary, inductors may be series-connected with the capacitors 31, 33, 35. They are located between the capacitors and the circuit formed by the two inductors 32 and 34 as indicated in FIG. 3.

Figure 4:
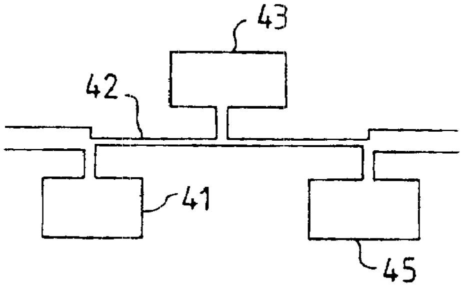
FIG. 4 shows the harmonic filtering function on an etched circuit according to the prior art.

When the above is expressed in terms of distributed constants, we obtain the drawing of FIG. 4. The inductors are replaced by high-impedance etched lines (having a width smaller than that of a 50-Ohm line) and the capacitors are replaced by copper regions.

The separation of the two functions, namely the lightning protection function and the harmonic filtering function, raises various problems.

First of all, the most commonly-used circuits are the lumped-element circuits of FIGS. 1 and 3, and they are bulky. The distributed-constant circuits too take up much space because the capacitors are etched rectangles of about 1 $cm^2$ on substrates with high dielectric permittivity (10) and the quarter-wave lines correspond to wavelengths of 2 to 3 cm. These dimensions are given as an example for frequencies of about one GHz. These dimensions are not negligible, especially in embedded applications.

Again, the series-connection of these two functions on an etched circuit, through the mutual mismatching of the two circuits, may induce impaired performance as compared with the anticipated results of the two separate functions.

Furthermore, it is impossible to position these two functions in an optimal way. Indeed, the lighting protection function as well as the harmonic filtering function should be the first function found after the antenna connector. This is the obvious position for the lightning protection which must protect the entire transmission circuit. However, the harmonic filtering function too must be as far downline as possible from the transmission because there is a risk of the creation of harmonics, especially $2f_0$ and $3f_0$ harmonics, by the antenna switching circuits or by coupling.

Figure 5:
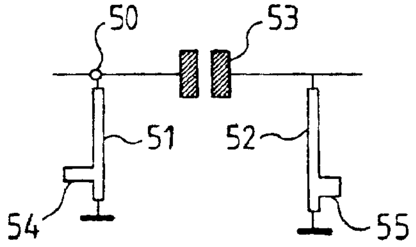
FIG. 5 shows the common function of lightning protection and of filtering of the harmonics $2f_0$ and $3f_0$ according to the invention.

The lightning protection circuit according to the invention shown in FIG. 2 already enabled the filtering of the second harmonic $2f_0$ by using a single circuit to overcome these drawbacks. The presence of a second line in the lightning protection scheme of FIG. 2 brings the possibility of rejecting the third harmonic too. As can be seen in FIG. 5, the lengths are then optimized and a matching topology is then simulated to ensure optimum rejection of the two harmonics as well as low loss at the fundamental frequency $f_0$. This optimization may be obtained by means of an etched circuit simulation tool, for example the ADS tool by AGILENT Technologies.

In FIG. 5, the optimized circuit for lightning protection and second and third harmonic filtering has two lines 51 and 52 with respective lengths $l_1$ and $l_2$ determined, during the simulation, each line being terminated by a short-circuit. These lines 51 and 52 have open stubs 54 and 55. The first line is connected to the output connector of the antenna. A capacitor 53 carries out the high-pass filtering of the lightning protection. It is placed between the two lines on the main line.

Figure 6:
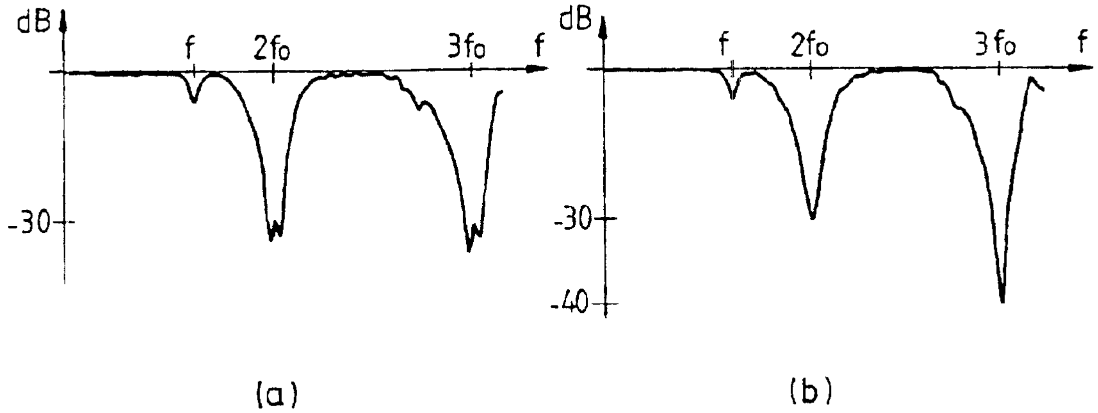
FIGS. 6*a* and 6*b*, is a curve showing the filtering of the harmonics by means of the filter of FIG. 5, with FIG. 6*b* corresponding to the optimized filter.

FIG. 6 shows the first measurements of the filtering of the harmonics in FIGS. 6*a* and 6*b*. It represents the amplitude in dB of the signal at output of a lightning protection circuit according to the invention as a function of its frequency. The injected lightning wave is equal to 1000V. It is attenuated to about 50 V.

FIG. 6*a* corresponds to the first measurements with a circuit of the type shown in FIG. 5. It shows a minimum 30 dB attenuation of the output signal at the two frequencies $2f_0$ and $3f_0$.

FIG. 6*b* corresponds to the measurements obtained after the optimization of this circuit. The optimization gives values of 40 dB for $2f_0$ and 50 dB for $3f_0$.

Hence, lightning protection circuits of this kind, especially the one illustrated in FIG. 5, enable the filtering of the second harmonic $2f_0$ and of the third harmonic $3f_0$. In particular, these circuits may have a common function of lightning protection and of the filtering of one or more harmonics $nf_0$ (n being an integer $\geqq 3$).

The circuit of FIG. 5 is an exemplary embodiment of a circuit comprising a common function of lightning protection and harmonic filtering. More generally, it may be planned to optimize this circuit with the same simulation tools for the rejection of the n first harmonics (n being an integer $\geqq 3$). For this purpose, the circuit may comprise one or more lines terminated by a short-circuit. These lines will have lengths to be determined that are identical or different, widths to be determined that are constant or not constant and identical or not identical. They may or may not comprise one or more stubs whose size has to be determined.

The advantage of such a circuit therefore is the gain in surface area because both functions of lightning protection and harmonic filtering are obtained in a single circuit. Furthermore, this circuit does not call for a large etching surface area like the harmonic filtering circuit of FIG. 4. Indeed, it only uses lines that can be "wound" or folded. Another advantage of this type of circuit is the possibility of optimizing its performance and reproducibility. Indeed, it provides for a single, fully controlled adaptation. Each function is the first function to be perceived from the antenna.

The manufacture of an etched circuit with lightning protection as illustrated, for example, in FIGS. 2 and 5, comprises the etching of the lines and of the capacitor of said circuit etched on the base of said circuit, the depositing of a film of conductive material and, if necessary, the scraping away of the excess conductive material in order to keep only the conductive material that has been deposited in the etching.

This device can be applied to any field requiring either and/or both of these functions. In fact, transmitters in all communications, broadcasting or identification systems such as IFF, TACAN and DME systems may use such a circuit. When the transmission is made no longer at a fixed frequency but in a frequency band, the performance values accessible in this band have to be verified.

Obviously, numerous modifications and variations of the present invention are possible in light of the above teachings. It is therefore to be understood that within the scope of the appended claims, the invention may be practiced otherwise than as specifically described herein.

What is claimed is:

1. An etched circuit with lightning protections, comprising:

- at least one main line connected to an output of a transmission antenna of a transmission system working at a fixed frequency $f_0$ or in a narrow frequency band $\Delta f_0$ around the fixed frequency $f_0$;
- at least one first line, with a first length and a first width, connected to the main line and substantially equivalent to an open circuit with respect to the main line for the frequency $f_0$.

2. The etched circuit with lightning protection according to claim 1, further comprising:

- a second line, with a second length and a second width, connected to the main line and substantially equivalent to an open circuit with respect to the main line for the frequency $f_0$; and
- a capacitor arranged on the main line and between the first line and the second line.

3. The etched circuit with lightning protection according claim 1, wherein the widths of the first and second lines are different.

4. The etched circuit with lightning protection according to claim 1, wherein the first line comprises at least one first open stub.

5. The etched circuit with lightning protection according to claim 4, wherein the second line comprises at least one second open stub.

6. The etched circuit with lightning protection according to claim 1, wherein the first length of the first line is a quarter of the wavelength of the frequency $f_0$.

7. The etched circuit with lightning protection according to claim 1, wherein the width or the length of the first line is determined as a first function of a harmonic or harmonics $nf_0$, n being an integer greater than or equal to 2 to be filtered.

8. The etched circuit with lightning protection according to claim 7, wherein the function is of a second harmonic $2f_0$ or a third harmonic $3f_0$, n being equal to 2 or 3.

9. The etched circuit with lightning protection according to claim 7, wherein the function is of one of more harmonics $nf_0$, n being greater than 3.

10. The etched circuit with lightning protection according to claim 6, wherein the second length of the second line is a quarter of the wavelength of the frequency used $f_0$.

11. The etched circuit with lightning protection according to claim 7, wherein the width or the length of the second line is determined as the first or a second function of a harmonic or harmonics $nf_0$, n being greater than or equal to 2, to be filtered.

12. An etched circuit with lightning protection according to claim 1, wherein a width or a length of the first stub is determined as a first function of a harmonic or harmonics $nf_0$, n being an integer greater than or equal to 2, to be filtered.

13. The etched circuit with lightning protection according to claim 12, wherein a width or a length of the second stub is determined as the first or a second function of a harmonic or harmonics $nf_0$, n being an integer greater than or equal to 2, to be filtered.

14. A method for the manufacture of the etched circuit with lightning protection according to one of the claims 1-7 and 8-13, the method comprising:

etching of the lined of said etched circuit on the base of said etched circuit;

depositing of a film of conductive material;

if necessary, scraping away an excess of the conductive material in order to retain only conductive material that has been deposited in the lines and the capacitor.

* * * * *